United States Patent
Deflorian et al.

(10) Patent No.: US 12,222,232 B2
(45) Date of Patent: Feb. 11, 2025

(54) REMOVABLE SIGNALING DEVICE OF THE EXHAUSTION OF A DISPENSER/DIFFUSER OF LIQUID ACTIVE SUBSTANCES

(71) Applicant: ZOBELE HOLDING S.P.A., Trento (IT)

(72) Inventors: Stefano Deflorian, Trento (IT); Cedric Morhain, Trento (IT)

(73) Assignee: ZOBELE HOLDING S.P.A., Trento (IT)

( * ) Notice: Subject to any disclaimer, the term of this patent is extended or adjusted under 35 U.S.C. 154(b) by 0 days.

(21) Appl. No.: 18/683,407

(22) PCT Filed: Aug. 31, 2022

(86) PCT No.: PCT/IB2022/058164
§ 371 (c)(1),
(2) Date: Feb. 13, 2024

(87) PCT Pub. No.: WO2023/031816
PCT Pub. Date: Mar. 9, 2023

(65) Prior Publication Data
US 2024/0263986 A1   Aug. 8, 2024

(30) Foreign Application Priority Data

Sep. 1, 2021   (IT) .......................  102021000022706

(51) Int. Cl.
*G01F 23/00*   (2022.01)
*A01M 1/20*   (2006.01)
*G01F 23/263*   (2022.01)

(52) U.S. Cl.
CPC ....... *G01F 23/0007* (2013.01); *A01M 1/2022* (2013.01); *G01F 23/265* (2013.01)

(58) Field of Classification Search
CPC .. G01F 23/0007; G01F 23/265; A01M 1/2022
See application file for complete search history.

(56) References Cited

U.S. PATENT DOCUMENTS

| | | | | |
|---|---|---|---|---|
| 8,857,731 | B2 * | 10/2014 | Riera Giner | A61L 9/037 239/34 |
| 9,027,795 | B2 * | 5/2015 | Zaima | B05B 15/62 222/113 |
| 2020/0281416 | A1 * | 9/2020 | Schultz | A47K 5/1211 |

FOREIGN PATENT DOCUMENTS

| | | | |
|---|---|---|---|
| EP | 0992767 | A1 | 4/2000 |
| EP | 1985316 | A1 | 10/2008 |

(Continued)

OTHER PUBLICATIONS

International Search Report and Written Opinion of the ISA for PCT/IB2022/058164 mailed Nov. 9, 2022, 13 pages.

(Continued)

*Primary Examiner* — David Z Huang
(74) *Attorney, Agent, or Firm* — NIXON & VANDERHYE

(57) ABSTRACT

A removable signaling device of the exhaustion of a dispenser/diffuser of a liquid active substance contained in a container of the dispenser/diffuser, wherein the device consists of a central body from which project two opposite lateral arms, which surround at least part of the dispenser/diffuser, and an appendix which extends alongside the container and carries a self-powered liquid sensor facing the container.

15 Claims, 2 Drawing Sheets

(56) References Cited

FOREIGN PATENT DOCUMENTS

| | | |
|---|---|---|
| EP | 3357831 A1 | 8/2018 |
| GB | 2560085 A | 8/2018 |
| WO | 2007138247 A1 | 12/2007 |
| WO | 2013127564 A1 | 9/2013 |

OTHER PUBLICATIONS

International Preliminary Report on Patentability for PCT/IB2022/058164 completed Apr. 14, 2023, 14 pages.

\* cited by examiner

REMOVABLE SIGNALING DEVICE OF THE EXHAUSTION OF A DISPENSER/DIFFUSER OF LIQUID ACTIVE SUBSTANCES

CROSS-REFERENCE TO RELATED APPLICATIONS

This application is the U.S. national phase of International Application No. PCT/IB2022/058164 filed Aug. 31, 2022 which designated the U.S. and claims priority to IT 102021000022706 filed Sep. 1, 2021, the entire contents of each of which are hereby incorporated by reference.

FIELD OF THE INVENTION

The present invention refers to a removable signalling device of the exhaustion of a dispenser/diffuser of liquid active substances, i.e., a stand-alone accessory which can be easily applied to the body of a dispenser/diffuser of liquid active substances, and which is apt to send a warning signal when the reserve of liquid active substance inside said dispenser/diffuser is exhausted.

STATE OF THE PRIOR ART

The indoor use of dispensers/diffusers of liquid active substances, whether by evaporation at room temperature or by heating, is now widespread, such liquid active substances having for example, a repellent effect against harmful insects, or a perfuming effect to eliminate bad smells.

Current dispensers/diffusers of liquid active substances are prolonged run time appliances, which work autonomously from a minimum of a few days up to a maximum of about three months—and more rarely even beyond—depending on the distinct types. Furthermore, the effective useful life of every single appliance obviously depends on the conditions of temperature and humidity in the installation site, which can promote or slow down the evaporation of the liquid active substance, and, finally, on any discontinuous use of the appliance itself. A currently available dispenser/diffuser typical drawback is therefore that it is not possible to exactly figure out their service life but only assess it by periodically detecting the actual presence of residual liquid active substance in the container of said dispensers/diffusers.

However, such outwardly trivial operation, is not easy to carry out because such appliances are often placed in inaccessible positions, to hide them from view, or inserted into an electrical socket near the floor, and thus a direct examination of the amount of liquid active substance still present in the container is inconvenient and requires a minimum waste of time. Thus, it frequently happens that the residual amount of liquid active substance in the container is only rarely checked in practical use, leading to a user finding himself noticing that the appliance no longer works, and consequently recharging it with a fresh reserve of liquid active substance only when the device itself has already ceased its function for several days or even weeks.

The need has long been felt in the field for a more effective end-of-life indicator which could be more promptly detected by a user, and for this reason various solutions have already been provided in the known art for detecting and signalling—through electronic means—the complete consumption of the liquid active substance of a dispenser/diffuser of such substance.

WO-2007/138247 (2007), EP-1985316 (2008) and U.S. Pat. No. 8,857,731 dis-close diverse types of dispensers/diffusers of liquid active substances comprising an emitter and a receiver of light or electrical signals. Such emitter and receiver mutually communicate to first determine whether a container of liquid active substance is installed on the dispenser/diffuser, and subsequently whether a liquid active substance is contained in the same.

However, the above indicated known solutions necessarily re-quire to completely redesign the device by integrating an intrusive emitter and receiver inside the device and/or the refill, which makes these components more expensive and requires that the user wishing to take advantage of such technological improvement discards the device already in use and buy a new one.

The technical problem addressed by the present invention is therefore that of providing a signalling device of the exhaustion of a liquid active substance inside a dispenser/diffuser, which can be easily removably combined with any such appliance already present on the market, such device being also apt to detect the exhaustion of a liquid active substance in a respective container of the appliance in use, and to timely and effectively notify the user of such exhaustion.

Within this problem, a first object of the invention is to provide a signalling device of this type which can be stably coupled with the dispenser/diffuser whose content of liquid active substance is to be monitored, said coupling being quick and easy to accomplish without the need to use any additional fastening means or device.

A second object of the invention is then to provide a signalling device as above, which does not need any electrical connection to the coupled dispenser/diffuser.

SUMMARY OF THE INVENTION

This problem is solved, and these objects achieved, by means of a removable signalling device of the exhaustion of a liquid active substance inside a dispenser/diffuser thereof, having the features defined in claim 1. Other preferred features of said removable signalling device are defined in the secondary claims.

BRIEF DESCRIPTION OF THE DRAWINGS

Further features and advantages of the removable signalling device according to the present invention will anyhow become better evident from the following detailed description of a preferred embodiment of the same, given by mere way of non-limiting example and illustrated in the accompanying drawings, wherein.

DETAILED DESCRIPTION OF THE PREFERRED EMBODIMENT

According to the present invention, to solve the problem highlighted above by means of a structurally simple and immediately applicable solution, the removable signalling device consists of a self-standing and self-powered accessory apt to stably engage with a dispenser/diffuser of liquid active substances. Furthermore, the removable signalling device has no electrical connection to the dispenser/diffuser nor, preferably, separate mechanical connecting means thereto, and is provided both with detection means for detecting the end of the useful life of the liquid active substance reserve of the dispenser/diffuser, and with signalling means for signalling to the user the exhaustion of the liquid active substance in the respective container.

Preferably, the dispenser/diffuser of liquid active substances is an appliance with a deodorizing or insecticidal effect, however, the present invention is aimed at detecting the exhaustion of any liquid active substance, regardless of the type of said substance and of the use such substance is intended for. It is therefore clear that the removable signalling device of the present invention can be used with any consumable liquid active substance and, more in general, with any appliance having a container filled with a gradually depleting liquid, whose exhaustion must be monitored.

Figure 2:
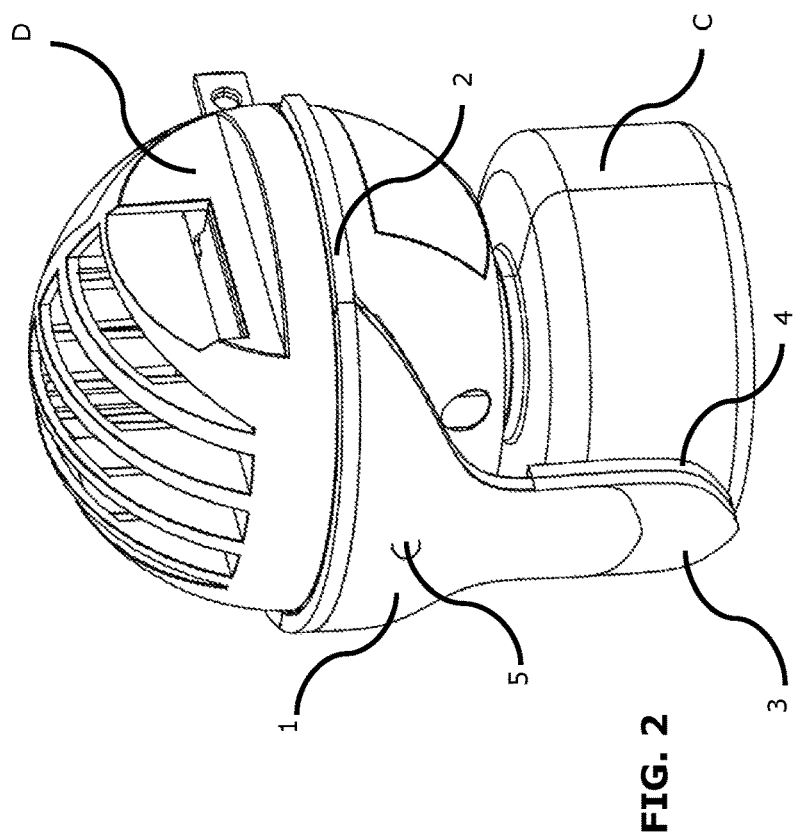
FIG. 2 is a perspective view of the removable signalling device of FIG. 1 coupled to a dispenser/diffuser appliance.
Figure 1:
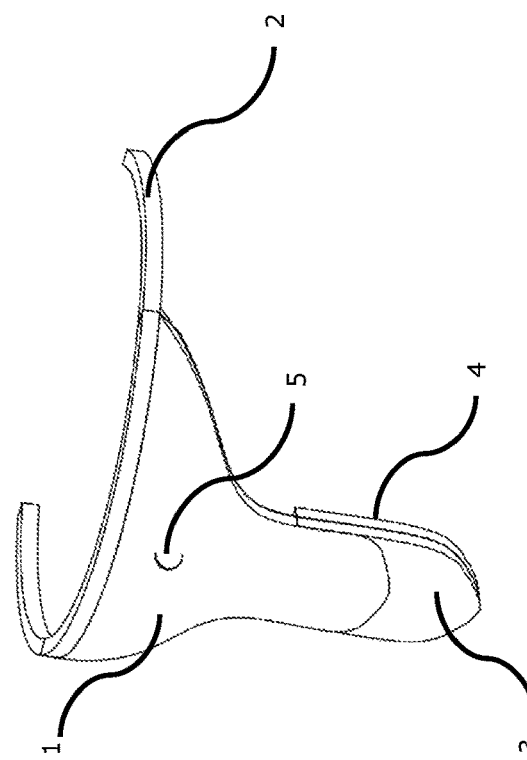
FIG. 1 is a perspective view of the removable signalling device of the present invention.

With reference now to the specific embodiment of the removable signalling device of the invention illustrated in the drawings, it can be noted in FIG. 1 that such removable signalling device consists of a central body 1 which extends into two opposing elastic lateral arms 2 on both sides and into an appendix 3 in its lower part.

Figure 4:
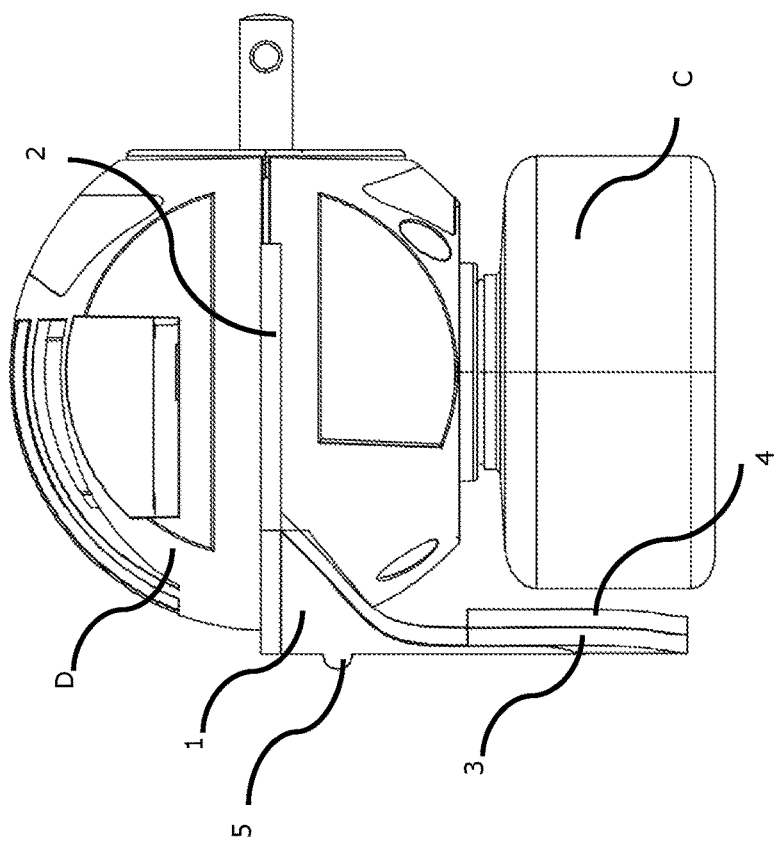
FIG. 4 is a side view of the coupled removable signalling device of FIG. 2.
Figure 3:
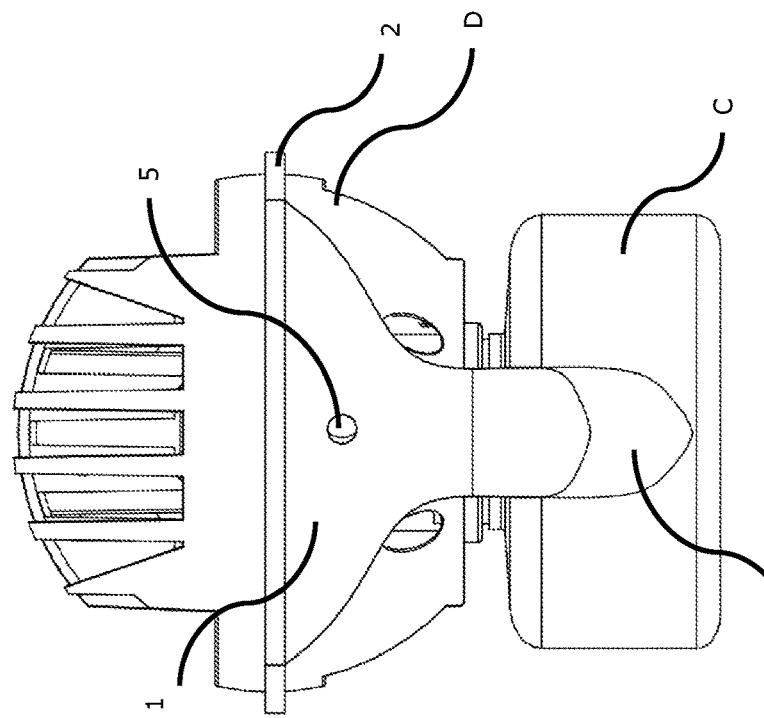
FIG. 3 is a front view of the coupled removable signalling device of FIG. 2.

Preferably, the removable signalling device of the invention is made by injection moulding of a suitable plastic material, and the arms 2 are C- or U-shaped and sufficiently extended and thin to acquire a shape elasticity which allows a stable elastic snap coupling of said removable signalling device on the dispenser/diffuser D. In particular, the arms 2 preferably surround more than half of the dispenser/diffuser D, while the appendix 3 extends alongside the container C of liquid active substance, as clearly shown in FIG. 4.

Preferably, the arms 2 have such a shape as to also allow a precise and well-defined positioning of the removable signalling device onto the dispenser/diffuser D, so that a liquid sensor 4 applied to the inner wall of the appendix 3, hence facing the container C, is arranged in a position corresponding to the area wherein the liquid active substance contained in the container C can be measured for the last time. For example, the arms 2 can be provided with an internal rib which corresponds to an existing groove on the dispenser/diffuser D.

However, since the removable signalling device of the invention must be used on any appliances D already existing on the market, and which therefore have been designed without providing for the use of such a type of signalling device, it is very likely that the dispenser/diffuser D does not show any special feature for an easy positioning thereon of the removable signalling device of the invention. Such device must therefore fit to the already existing intrinsic features of the appliance in use. However, since many dispensers/diffusers currently available on the market consist of an upper housing and a lower housing, a satisfactory opportunity is to make use of the parting line between the upper and the lower housing as a groove for positioning the removable signalling device of the invention.

The liquid sensor 4, apt to detect the presence/absence of liquid active substance in the container 3, can be made by using various technologies, per se already well known to those skilled in the art, and is controlled by a microprocessor according to a predefined automatic routine. In a preferred embodiment, the liquid sensor 4 detects the liquid level by detecting the electrical capacity of the assembly consisting of the walls of the container C and the liquid active substance contained therein or, alternatively, the electrical capacity of the same container C with no liquid active substance therein, i.e., full of air.

Once the liquid sensor 4 detects the exhaustion of the liquid active substance, the control microprocessor sends a warning signal to the user. This signal can be, for example, a bright visual signal, such as a lit LED at the warning light 5, or an audio signal, or any other type of signal which can be received and understood by a user. For example, the signal can be a notification to a smart device, such as a user's smartphone, and the communication can preferably occur via the BLUETOOTH transmission proto-col.

The removable signalling device of the present invention is autonomously powered by a button cell. To save the battery energy, and thus extend the removable signalling device useful life, detection by the liquid sensor 4 is not made continuously but at regular intervals, which are separated by preset lengths of time wherein the liquid sensor 4 is not active. Ideally, such length of time wherein the liquid sensor 4 is not active equals the time needed by the wick of the dispenser/diffuser D to completely clear itself of the liquid active substance, after there is no more liquid active substance visible in the container C; depending on the appliance D model, such length of time varies from 2 to 24 hours.

Every time the liquid sensor 4 performs a "sampling" of the detected signal, it uses a portion of the battery energy to perform the following operations:
 a. waking up the microprocessor;
 b. activating the liquid sensor 4;
 c. recording the reading from the liquid sensor 4;
 d. checking whether the afore-mentioned signal reading, based on a specific algorithm, defines the refill as exhausted;
  1. if YES, sending a predefined warning signal to the user;
  2. if NO, updating the system clock to the next microprocessor wake-up operation.

In an alternative embodiment, the removable signalling device of the invention consists of two elements which can mutually slide onto each other, so that the appendix 3 position, and hence that of the liquid sensor 4, can be adjusted with respect to the central body 1 and the lateral arms 2. In such embodiment, the liquid sensor 4 position can be more easily adapted to several types of dispenser/diffuser D and container C.

From the foregoing description it is evident how the removable signalling device of the present invention has fully achieved the intended objects, in a particularly effective way. Said removable signalling device can be easily snapped onto the dispenser/diffuser D where it remains steadily fixed by the elastic arms 2 which cooperate with the same, whilst the self-powered liquid sensor 4 provides a visible/audible or directly readable signal as a direct notification on a user's smartphone via Bluetooth connection. The removable signalling device according to the present invention is therefore operatively fully independent from the dispenser/diffuser D and can be easily reused on several types of dispenser/diffuser D, according to the user's needs.

However, it is understood that the invention should not be considered as limited to the specific arrangements illustrated above, which are only exemplary embodiments thereof, but that different variants are possible, all within the reach of a person skilled in the art, without thereby departing from the scope of protection of the invention itself, which is only defined by the following claims.

The invention claimed is:
1. Removable signaling device of the exhaustion of a dispenser/diffuser of a liquid active substance contained in a container of said dispenser/diffuser, the removable signaling device comprising: a central body from which project two opposite lateral arms, which surround at least part of said dispenser/diffuser, and an appendix which extends alongside said container, in a vertically adjustable position with respect to the central body and the lateral arms, and carries a self-powered liquid sensor facing said container.

2. The removable signaling device as in claim 1, wherein said lateral arms, as a whole, have a C- or U-shape.

3. The removable signaling device as in claim 2, wherein said lateral arms are extended and thin enough to be imparted with a shape elasticity which allows an elastic snap coupling of said removable signaling device on the dispenser/diffuser.

4. The removable signaling device as in claim 3, wherein said lateral arms extend beyond a half of the dispenser/diffuser.

5. The removable signaling device as in claim 1, wherein said lateral arms have an internal rib apt to be coupled with a parting groove between an upper housing and lower housing of said dispenser/diffuser.

6. The removable signaling device as in claim 1, wherein said appendix length is such that said liquid sensor applied on the inner wall of the appendix is arranged in a position corresponding to an area wherein the liquid active substance contained in the container can be measured prior to exhaustion of the liquid active substance.

7. The removable signaling device as in claim 6, wherein said appendix is formed in a separate element which can vertically slide with respect to the central body and the lateral arms of the removable signaling device.

8. The removable signaling device as in claim 1, wherein said liquid sensor is powered by a button cell and controlled by a microprocessor responsive to detection of a signal representing the level of liquid active substance in the container.

9. The removable signaling device as in claim 8, wherein said microprocessor is configured to perform the following steps:
 a. waking up the microprocessor;
 b. activating the liquid sensor;
 c. recording a signal reading from the liquid sensor which represents the quantity of active liquid substance in the container;
 d. checking whether the afore-mentioned signal reading, based on a specific algorithm, defines the container as exhausted;
  i. if YES, sending a predefined warning signal to the user;
  ii. if NO, updating the system clock to the next microprocessor wake-up operation.

10. The removable signaling device as in claim 2, wherein said liquid sensor is powered by a button cell and controlled by a microprocessor responsive to detection of a signal representing the level of liquid active substance in the container.

11. The removable signaling device as in claim 3, wherein said liquid sensor is powered by a button cell and controlled by a microprocessor responsive to detection of a signal representing the level of liquid active substance in the container.

12. The removable signaling device as in claim 4, wherein said liquid sensor is powered by a button cell and controlled by a microprocessor responsive to detection of a signal representing the level of liquid active substance in the container.

13. The removable signaling device as in claim 5, wherein said liquid sensor is powered by a button cell and controlled by a microprocessor responsive to detection of a signal representing the level of liquid active substance in the container.

14. The removable signaling device as in claim 6, wherein said liquid sensor is powered by a button cell and controlled by a microprocessor responsive to detection of a signal representing the level of liquid active substance in the container.

15. The removable signaling device as in claim 7, wherein said liquid sensor is powered by a button cell and controlled by a microprocessor responsive to detection of a signal representing the level of liquid active substance in the container.

* * * * *